United States Patent [19]

Young et al.

[11] Patent Number: 5,085,884
[45] Date of Patent: Feb. 4, 1992

[54] REDUCED CALORIE POTATO CHIPS AND OTHER LOW MOISTURE FAT-CONTAINING FOODS HAVING LESS WAXINESS AND IMPROVED FLAVOR DISPLAY

[75] Inventors: Jerry D. Young, Cincinnati; Jeffrey J. Kester, West Chester; Thomas J. Wehmeier, Cincinnati; Mary M. Fox, Fairfield; James C. Letton, Forest Park, all of Ohio

[73] Assignee: The Procter & Gamble Company, Cincinnati, Ohio

[21] Appl. No.: 514,800

[22] Filed: Apr. 26, 1990

[51] Int. Cl.⁵ .............................................. A23D 9/00
[52] U.S. Cl. .................................. 426/611; 426/606; 426/607; 426/804
[58] Field of Search ............... 426/611, 601, 606, 607, 426/438, 804

[56] References Cited

U.S. PATENT DOCUMENTS

| | | |
|---|---|---|
| 3,093,481 | 6/1963 | Eckey et al. . |
| 3,158,490 | 11/1964 | Baur et al. . |
| 3,600,186 | 8/1971 | Mattson et al. . |
| 3,649,647 | 3/1972 | Ota et al. . |
| 4,005,195 | 1/1977 | Jandacek . |
| 4,005,196 | 1/1977 | Jandacek . |
| 4,034,083 | 7/1977 | Mattson . |
| 4,797,300 | 1/1989 | Jandacek et al. . |
| 4,940,601 | 7/1990 | Orphanes et al. ............... 426/601 |

FOREIGN PATENT DOCUMENTS

| | | |
|---|---|---|
| 233856 | 8/1987 | European Pat. Off. . |
| 236288 | 9/1987 | European Pat. Off. . |
| 290421 | 3/1988 | European Pat. Off. . |
| 287157 | 10/1988 | European Pat. Off. . |
| 290065 | 11/1988 | European Pat. Off. . |
| 290420 | 11/1988 | European Pat. Off. . |
| 311154 | 4/1989 | European Pat. Off. . |
| 227137 | 9/1985 | Fed. Rep. of Germany . |
| 228457 | 10/1985 | Fed. Rep. of Germany . |
| 49-26220 | 3/1974 | Japan . |
| 52-27694 | 7/1977 | Japan . |
| 58-78531 | 5/1983 | Japan . |
| 59-143550 | 8/1984 | Japan . |
| 59-156242 | 8/1984 | Japan . |
| 63-78550 | 6/1989 | Japan . |

Primary Examiner—Donald E. Czaja
Assistant Examiner—Drew S. Workman
Attorney, Agent, or Firm—Eric W. Guttag; Ronald L. Hemingway; Richard C. Witte

[57] ABSTRACT

Reduced calorie potato chips, and other low moisture fat-containing foods having less waxiness and improved flavor display are dislosed. These benefits are typically obtained by applying to the surface of the potato chip, or other food, fat compositions having certain thixotropic areas that correlate to reduced waxiness impressions. These fat compositions comprise a nondigestible fat component, and optionally a digestible triglyceride fat or oil. The nondigestible fat component comprises a nondigestible oil and preferably low levels of certain solid polyol fatty acid polyesters having ester groups comprising combinations of unsaturated ($C_{12}$ or higher) and/or short chain ($C_2$-$C_{12}$) saturated fatty acid radicals and long chain ($C_{20}$ or higher) saturated fatty acid radicals. The solid polyol polyesters bind the liquid oils and thus control or prevent passive oil loss, even at relatively low levels.

50 Claims, No Drawings

REDUCED CALORIE POTATO CHIPS AND OTHER LOW MOISTURE FAT-CONTAINING FOODS HAVING LESS WAXINESS AND IMPROVED FLAVOR DISPLAY

TECHNICAL FIELD

This application relates to reduced calorie potato chips and other low moisture fat-containing foods having less waxiness and improved flavor display. This application further relates to fat compositions useful in preparing such potato chips and other low moisture fat-containing foods.

Salted snacks such as potato chips, corn chips and tortilla chips are particularly popular consumer snack products. In the case of potato chips, whole potatoes are cut up into potato slices, or else are mashed, dried to provide potato flakes or granules, reconstituted to form a sheet of potato dough, and then pieces are fabricated from the potato dough sheet. These potato slices or fabricated potato pieces are then immersed in a frying fat or oil medium that has been heated to temperatures of approximately 300° to 400° F. (148.9° to 204.4° C.).

The potato slices or fabricated potato pieces can be immersed in this hot frying medium for varying lengths of time, typically on the order of about 10 seconds to about 3 minutes, 30 seconds. While immersed, the slices or pieces absorb a substantial quantity of the frying fat or oil, typically on the order of from about 25 to about 50% by weight of the resulting potato chip. Typically, this frying medium comprises soybean oil, cottonseed oil or peanut oil. Accordingly, since this frying fat or oil comprises almost exclusively triglycerides, this imparts a significant caloric content (about 9 calories per gram of oil absorbed) to the potato slices or fabricated potato pieces, as well as other foods fried in such mediums.

Certain polyol fatty acid polyesters have been suggested as low calorie substitutes for these triglyceride fats and oils. For example, U.S. Pat. No. 3,600,186 to Mattson et al, issued Aug. 17, 1971, discloses low calorie food compositions in which at least a portion of the fat content of a fat-containing food is provided by a nonabsorbable, non-digestible sugar fatty acid ester or sugar alcohol fatty acid ester having at least 4 fatty acid ester groups with each fatty acid having from 8 to 22 carbon atoms. Foods in which these polyol polyesters are particularly useful as partial or complete replacements for triglyceride fats or oils include products suitable for use in frying. Unfortunately, regular ingestion of moderate to high levels of completely liquid forms of these polyol polyesters can produce undesirable passive oil loss, namely, leakage of the polyesters through the anal sphincter. By contrast, completely solid versions of these polyesters provide a sufficiently high solids content at mouth temperatures (e.g., 92° F., 33.3° C.) such that they taste waxy in the mouth when ingested.

As an alternative to these completely liquid or completely solid nondigestible/nonabsorbable polyol polyesters, certain intermediate melting polyol fatty acid polyesters have been developed that provide passive oil loss control, while at the same time reducing waxiness in the mouth. See European patent application 236,288 to Bernhardt, published Sept. 9, 1987 and European patent application 233,856 to Bernhardt, published Aug. 26, 1987. These intermediate melting polyol polyesters exhibit a unique rheology at body temperatures due to a matrix involving a minimal level of solids (e.g. about 12% or lower) that bind the remaining liquid portion. As a result, these intermediate melting polyol polyesters are sufficiently viscous and have a sufficiently high liquid/solid stability at body temperatures to control passive oil loss. An example of such intermediate melting polyol polyesters are those obtained by substantially completely esterifying sucrose with a 55:45 mixture of fully hydrogenated (hardstock) and partially hydrogenated soybean oil fatty acid methyl esters. See Examples 1 and 2 of the above European patent applications.

The above European applications disclose these intermediate melting polyol polyesters to be useful as total or partial replacements for other fats and oils in various food products, including cooking and frying oils. However, it has been found that potato chips that are fried in frying fats containing substantial levels of these intermediate melting polyol polyesters, particularly at levels in excess of about 40%, have significantly increased waxiness impressions compared to potato chips that have been fried in the triglyceride fat or oil that has been replaced. (In terms of physical properties, "waxiness" relates to how the fat composition is sensed in the mouth.) Indeed, this increased waxiness impression with regard to these intermediate melting polyol polyesters is recognized by European patent application 233,856 in that digestible food materials, such as triglycerides and substituted mono- and diglycerides, that act as solvents for these intermediate melting polyol polyesters are included in the fat composition. However, as the proportion of triglycerides is increased relative to the intermediate melting polyol polyesters to impart less waxiness to the potato chips, the caloric content of the frying fat also increases accordingly. In addition, it has been found that frying fats containing greater than about 40% of these intermediate melting polyol polyesters can adversely affect the flavor display of the resulting fried potato chips.

The potential waxiness problems occasioned by frying potato chips in frying fats containing greater than about 40% of these intermediate melting polyol polyesters is not necessarily apparent at the time the potato chip is fried, but can become recognizable as the potato chip ages prior to consumption. During frying, the intermediate melting polyol polyesters are absorbed by the potato chips in a liquefied state. As crystallization of the solid portion of the intermediate melting polyol polyesters occurs over time, the increased amount of solids formed can lead to a detectable increase in waxiness, particularly if the intermediate melting polyol polyesters inherently contain a sufficiently high level of solids, e.g. on the order of about 12% at body temperatures. In addition, because these intermediate melting polyol polyesters can contain a relatively high level of solids to begin with, formulation flexibility with regard to the frying fat, particularly with regard to inclusion of other solid and/or plastic fat materials, is usually restricted to avoid effects on the organoleptic properties of the potato chips, such as waxiness and flavor display.

Accordingly, it would be desirable to be able to obtain reduced calorie potato chips and other fried, or fat-containing, foods having less waxiness and substantially unaltered flavor display. In addition, it would be desirable to maintain this less waxiness benefit for the reduced calorie potato chips and other fried, or fat-containing, foods over time. It would also be desirable to have formulation flexibility with regard to the fat compositions used in the preparation of such reduced calorie potato chips and other fried, or fat-containing, foods.

BACKGROUND ART

European patent application 311,154 to Letton, published Apr. 12, 1989, discloses fatty acid esters of sucrose where the fatty acid groups consist essentially of short chain fatty acid radicals having from 2 to 10 carbon atoms and long chain fatty acid radicals having from 20 to 24 carbon atoms in a molar ratio of short chain:long chain radicals of 5:3 to 3:5 with the degree of esterification being about 7 to 8. These solid sucrose polyester compounds are disclosed as having the ability to trap large amounts of liquid (e.g., nondigestible) oils when blended in relatively small amounts (on the order of from about 10 to 20%) with the liquid oils to convert them to solid compositions at temperatures below about 40° C. These solid sucrose polyesters are also disclosed as being particularly useful in preventing the anal leakage problem associated with the ingestion of liquid nondigestible oils. See page 3. Blends of these solid sucrose polyesters with liquid nondigestible oils can be used in baked farinaceous snack foods, and other baked salted snacks. See page 4, lines 4–5. In addition, shortening and oil products based on these blends can be used as cooking and frying oils. See page 4, lines 9–10. See also U.S. Pat. No. 4,797,300 to Jandacek et al, issued Jan. 10, 1989, which discloses plastic shortenings based on these blends of liquid nondigestible oils and 10–25% solid sucrose polyesters having mixed short chain/long chain saturated fatty acids, and their use in baked farinaceous snack foods, other baked salted snacks and cooking and frying oils.

European patent application 287,157 to Baginski et al, published Oct. 19, 1988, discloses frying mediums which comprise from about 35 to 100% sugar polyesters (e.g., intermediate melting sucrose polyester) having at least 70% octaester content and from 0 to about 65% other frying medium ingredients (e.g., glyceride oils). These frying mediums are used in the preparation of various fat-containing foods, including potato chips. Example 3 discloses two frying mediums containing 100% sucrose polyesters (12% or 30% solids at body temperature) that were used to fry fabricated (i.e., Pringles-style) potato chips. See also European patent application 290,420 to Guffey et al, published Nov. 9, 1988 (shortening products made with intermediate melting polyol polyesters, as well as food compositions having enhanced flavors due to the addition of these intermediate melting polyol polyester-containing shortenings, useful in fried foods such as Pringles, potato chips, corn chips, and tortilla chips); European patent application 290,065 to Guffey et al, published November 8, 1988 (food or beverage compositions having altered flavor display which contain polar or intermediate polarity flavor compounds, as well as a fat phase containing intermediate melting polyol polyesters, useful in fried foods such as Pringles, potato chips, corn chips and tortilla chips).

European patent application 236,288 to Bernhardt, published Sept. 9, 1987, discloses intermediate melting polyol polyesters as partial or complete replacements for other fats or oils. Amongst the various uses disclosed for these intermediate melting polyol polyesters are cooking and frying oils. See page 14. See also European patent application 233,856 to Bernhardt, published Aug. 26, 1987, which discloses combinations of these intermediate melting polyol polyesters with digestible food materials (e.g., triglycerides) which act as a solvent that can be used in cooking and frying oils.

U.S. Pat. No. 4,005,195 to Jandacek, issued Jan. 25, 1977. discloses liquid polyol fatty acid polyesters and anti-anal leakage agents (e.g., solid polyol fatty acid polyesters such as sucrose octastearate) used for the treatment of hypercholesterolemia. The anti-anal leakage agents can be included in amounts of at least about 10% by weight (e.g. from about 20 to about 50% by weight) of the liquid polyol polyester. In Example IV, a cooking fat is disclosed made with 50% liquid sucrose polyester and 50% cocoa butter; the sucrose polyester has an average 7.5 oleic acid ester groups per molecule of sucrose. See also Example V (plastic shortening suitable for frying that contains 50% liquid xylitol pentaoleate).

U.S. Pat. No. 4,005,196 to Jandacek, issued Jan. 25, 1977, discloses combinations of liquid polyol polyesters, anti-anal leakage agents, and fat-soluble vitamins. Example VI discloses a cooking fat made with 70% sucrose octaoleate and 30% sucrose octastearate.

DISCLOSURE OF THE INVENTION

The present invention relates to reduced calorie potato chips and other low moisture fat-containing foods having less waxiness and improved flavor display. These benefits are typically obtained by applying to the surface of the food a fat composition having a thixotropic area of about 200,000 pascals/second or less, and which comprises:

A. from about 10 to 100% of a nondigestible fat component having a Solid Fat Content (SFC) profile slope between 98.6° F. (37° C.) and 70° F. (21.1° C.) of from 0 to about $-0.75$ and comprising:
  (1) from about 60 to about 99% of a liquid nondigestible oil having a complete melting point below about 37° C.; and
  (2) from about 1 to about 40% solid polyol fatty acid polyesters having a complete melting point above about 37° C., wherein the polyol has at least 4 hydroxyl groups and wherein the ester groups comprise a combination of:
    (a) $C_{12}$ or higher unsaturated fatty acid radicals, $C_2$–$C_{12}$ saturated fatty acid radicals or mixtures thereof, and
    (b) at least about 15% $C_{20}$ or higher saturated fatty acid radicals, wherein the molar ratio of (a) to (b) radicals is from about 1:15 to about 2:1 and wherein at least 4 of the hydroxyl groups are esterified; and B. from 0 to about 90% of a digestible triglyceride fat or oil.

Surprisingly, the above-defined solid polyol fatty acid polyesters are capable of binding the liquid nondigestible oils, and thus controlling or preventing passive oil loss associated with the ingestion of such liquid nondigestible oils, even when included at relatively low levels, e.g. at from about 1 to about 9% of the nondigestible fat component. In addition, it has also been surprisingly found that the above-defined maximum thixotropic area correlates to a reduced waxiness impression for potato chips and other low moisture foods containing these fat compositions, and in particular to waxiness impressions much closer to those of potato chips fried in a 100% triglyceride oil.

The waxiness/flavor display improvements for the fat compositions of the present invention are believed to be due to two factors. One is the fact that the fat composition containing the above-defined solid polyol polyesters flows more readily when subjected to shear (i.e.

mastication) and, hence, is more readily dispersed in saliva. The other factor is that these solid polyol polyesters can be present in the nondigestible fat component at relatively low levels, e.g., at from about 1 to about 9%. This lower level of solid polyol polyesters is particularly important to waxiness/flavor display improvements as the total level of fat present in a potato chip or other low moisture food increases, and as higher levels of nondigestible fat component are included in the fat composition. The lower level of solid polyol polyesters that can be present in the nondigestible fat component of the compositions of the present invention can also lead to less waxiness as the potato chip or other low moisture fat-containing food ages prior to consumption. In addition, greater inclusion of solid and/or plastic triglyceride fats can be possible without negatively impacting the organoleptic properties of the potato chip or other low moisture fat-containing food, in particular waxiness and flavor display.

A. Definitions

By "nondigestible fat or oil" is meant that only about 70% or less of the fat or oil is digested by the body. Preferably, only about 20% or less of such fats or oils are digested.

By "digestible triglyceride fat or oil" is meant a triglyceride fat or oil that is substantially completely digested by the body. Typically, at least about 90% of such triglyceride fats or oils are digested.

As used herein, the term "comprising" means various components can be conjointly employed in the fat compositions of the present invention. Accordingly, the term "comprising" encompasses the more restrictive terms "consisting essentially of" and "consisting of".

All percentages and proportions used herein are by weight unless otherwise specified.

B. Fat Compositions

The fat compositions of the present invention are particularly characterized by a maximum thixotropic area. As used herein, the term "thixotropic area" refers to a rheological measurement of the fat composition that determines the energy per unit volume required to breakdown the physical structure of the fat under specific shear conditions. It has been surprisingly found that the thixotropic area of fat compositions of the present invention is correlatable to the waxiness impression for potato chips and other low moisture foods containing these compositions, as determined by organoleptic testing. In particular, a lower thixotropic area for the fat composition generally correlates to a reduced waxiness impression for potato chips and other low moisture foods containing these fat compositions. Indeed, the waxiness impression of potato chips of the present invention can be much closer to that of potato chips fried in a 100% triglyceride oil.

The maximum thixotropic area of the fat compositions of the present invention that is suitable in providing reduced waxiness impressions can vary somewhat depending on the food involved, and especially the fat content of the food. In the case of "high fat" foods (i.e., fat content of from about 33 to about 50%), the thixotropic area of the fat composition can be about 100,000 pascals/second (Pa/S) or less, preferably about 60,000 Pa/S or less, and most preferably about 20,000 Pa/S or less. In the case of "medium fat" foods (i.e., fat content of from about 22 to about 33%), the thixotropic area of the fat compositions of the present invention can be about 150,000 Pa/S or less, preferably about 100,000 Pa/S or less and most preferably about 60,000 Pa/S or less. In the case of "low fat" foods (i.e. fat content of from about 10 to about 22%), the thixotropic area can be about 200,000 Pa/S or less, preferably about 150,000 Pa/S or less, and most preferably about 100,000 Pa/S or less. In general, the thixotropic area of the fat composition can be increased as the fat content decreases and still provide reduced waxiness impressions in the potato chip or other low moisture fat-containing food.

A key ingredient of the fat compositions of the present invention is a nondigestible fat component. This nondigestible fat component comprises from about 10 to 100% of the composition. Preferably, this nondigestible fat component comprises from about 35 to 100%, more preferably from about 50 to 100%, and most preferably from about 75 to 100%, of the composition. Inclusion of higher levels of this nondigestible fat component is particularly desirable in terms of reducing the caloric value of the potato chip or other low moisture food containing these compositions.

This nondigestible fat component comprises a liquid nondigestible oil having a complete melting point below about 37° C., as well as certain solid polyol fatty acid polyesters having a complete melting point above about 37° C. Generally, this nondigestible fat component comprises from about 60 to about 99% of the liquid nondigestible oil, and from about 1 to about 40% of the solid polyol polyesters. Preferably, this nondigestible fat component comprises from about 85 to about 99% liquid nondigestible oil and from about 1 to about 15% solid polyol polyesters, more preferably from about 91 to about 99% liquid nondigestible oil and from about 1 to about 9% solid polyol polyesters, and most preferably from about 94 to about 99% liquid nondigestible oil and from about 1 to about 6% solid polyol polyesters. Inclusion of higher levels of liquid nondigestible oil (i.e. lower levels of solid polyol polyesters) can be desirable from the standpoint of reducing waxiness in the potato chips or other low moisture food containing the fat composition. However, higher levels of solid polyol polyesters (i.e. lower levels of liquid nondigestible oil) are desirable from the standpoint of controlling or preventing passive oil loss associated with the ingestion of such liquid nondigestible oils.

The nondigestible fat component is further characterized by a relatively flat Solid Fat Content (SFC) profile slope across the temperature range of from typical room temperature to body temperature, i.e. from 70° F. (21.1° C.) to 98.6° F. (37° C.). Typically, the SFC profile slope between these temperatures is from 0 to about $-0.75$. Generally, the greater the amount of $C_{20}$ or higher saturated fatty acid radicals in the solid polyol polyesters, the flatter will be the slope of the SFC profile. For example, at 30% $C_{20}$ or higher fatty acid radicals, the slope of the SFC profile will be typically from 0 to about $-0.5$, and at 50% it will be typically from 0 to about $-0.3$.

Suitable liquid nondigestible edible oils for use herein include liquid polyol fatty acid polyesters (see U.S. Pat. No. 4,005,927 to Jandacek, issued Jan. 25, 1977); liquid esters of tricarballylic acids (see U.S. Pat. No. 4,508,746 to Hamm, issued Apr. 2, 1985); liquid diesters of dicarboxylic acids such as derivatives of malonic and succinic acid (see U.S. Pat. No. 4,582,927 to Fulcher, issued Apr. 15, 1986); liquid triglycerides of alpha-branched chain carboxylic acids (see U.S. Pat. No. 3,579,548 to Whyte, issued May 18, 1971); liquid ethers and ether esters containing the neopentyl moiety (see U.S. Pat. No. 2,962,419 to Minich, issued Nov. 29, 1960); liquid fatty polyethers of polyglycerol (See U.S. Pat. No. 3,932,532 to Hunter et al, issued Jan. 13, 1976); liquid alkyl glycoside fatty acid polyesters (see U.S. Pat. No. 4,840,815 to Meyer et al, issued Jun. 20, 1989); liquid polyesters of two ether linked hydroxypolycarboxylic acids (e.g., citric or isocitric acid) (see U.S. Pat. No. 4,888,195 to Huhn et al, issued Dec. 19, 1988); liquid esters of epoxide-extended polyols (see U.S. Pat. No. 4,861,613 to White et al, issued Aug. 29, 1989); all of which are incorporated herein by reference, as well as liquid polydimethyl siloxanes (e.g., Fluid Silicones available from Dow Corning).

Preferred liquid nondigestible oils are the liquid polyol fatty acid polyesters that comprise liquid sugar fatty acid polyesters, liquid sugar alcohol fatty acid polyesters, and mixtures thereof, the sugars and sugar alcohols containing 4 to 11 hydroxyl groups (preferably from 4 to 8 hydroxyl groups) prior to esterification. With regard to the liquid polyol polyesters, the term "sugar" includes monosaccharides, disaccharides and trisaccharides. The term "sugar alcohol" refers to the reduction product of sugars wherein the aldehyde or ketone group has been reduced to an alcohol. The liquid polyol fatty acid polyesters are prepared by reacting a monosaccharide, disaccharide, trisaccharide or sugar alcohol thereof with fatty acids, as discussed below.

Examples of suitable monosaccharides are those containing 4 hydroxyl groups such as xylose, arabinose, and ribose; the sugar alcohol derived from xylose, i.e., xylitol, is also suitable. The monosaccharide erythrose is not suitable for the practice of the present invention since it only contains 3 hydroxyl groups; however, the sugar alcohol derived from erythrose, i.e., erythritol, contains 4 hydroxyl groups and is thus suitable. Among 5 hydroxyl-containing monosaccharides that are suitable for use herein are glucose, mannose, galactose, and fructose. A sugar alcohol derived from glucose, i.e., sorbitol, contains 6 hydroxyl groups and is also suitable as the polyol moiety of the polyesters. Examples of suitable disaccharides are maltose, lactose, and sucrose, all of which contain 8 hydroxyl groups. Examples of suitable trisaccharides include raffinose and maltotriose, both of which contain 11 hydroxyl groups. Preferred polyols for preparing the liquid polyesters for use in the present invention are selected from erythritol, xylitol, sorbitol, glucose and sucrose. Sucrose is especially preferred.

The liquid polyol fatty acid polyesters useful in the present invention must contain at least 4 fatty acid ester groups. Polyol fatty acid polyester compounds that contain 3 or less fatty acid ester groups are digested in and the products of digestion are absorbed from the intestinal tract much in the manner of ordinary triglyceride fats, whereas the polyol fatty acid polyester compounds that contain 4 or more fatty acid ester groups are substantially nondigestible and consequently nonabsorbable by the human body. It is not necessary that all of the hydroxyl groups of the polyol be esterified with fatty acids, but it is preferable that the disaccharide polyols contain no more than 3 unesterified hydroxyl groups, and more preferable that they contain no more than 2 unesterified hydroxyl groups. Most preferably, substantially all of the hydroxyl groups of the disaccharide polyol are esterified with fatty acids, e.g., the liquid sucrose polyesters have from about 7 to 8 hydroxyl groups esterified.

The sugar or sugar alcohol starting materials of these liquid polyol polyesters are esterified with fatty acids containing from 2 to 24 carbon atoms, preferably from 8 to 22 carbon atoms, and most preferably from 12 to 18 carbon atoms. Examples of such fatty acids include acetic, butyric, caproic, caprylic, capric, lauric, myristic, myristoleic, palmitic, palmitoleic, stearic, oleic, elaidic, ricinoleic, linoleic, linolenic, eleostearic, arachidonic, behenic, and erucic acid. The fatty acids can be derived from naturally occurring or synthetic fatty acids. Suitable sources of naturally occurring fatty acids include corn oil fatty acids, cottonseed oil fatty acids, peanut oil fatty acids, soybean oil fatty acids, canola oil fatty acids (i.e. fatty acids derived from low erucic acid rapeseed oil), sunflower seed oil fatty acids, sesame seed oil fatty acids, safflower oil fatty acids, palm kernel oil fatty acids, and coconut oil fatty acids. The fatty acids can be saturated or unsaturated, including positional or geometrical isomers, e.g., cis- or trans-isomers, and can be the same for all ester groups, or, more typically, are mixtures of different fatty acids.

The polyol fatty acid polyesters that are liquid have minimal or no solids at a temperature of 98.6° F. (37° C.), i.e., body temperatures. These liquid polyol polyesters typically contain fatty acid ester groups having a high proportion of $C_{12}$ or lower fatty acid groups or else a high proportion of $C_{18}$ or higher unsaturated fatty acid groups. In the case of those liquid polyol polyesters having high proportions of unsaturated $C_{18}$ or higher fatty acid groups, at least about half of the fatty acids incorporated into the polyester molecule are typically unsaturated. Preferred unsaturated fatty acids in such liquid polyol polyesters are oleic acid, linoleic acid, and mixtures thereof. The following are nonlimiting examples of specific liquid polyol fatty acid polyesters suitable for use in the present invention: sucrose tetraoleate, sucrose pentaoleate, sucrose hexaoleate, sucrose heptaoleate, sucrose octaoleate, sucrose hepta- and octaesters of unsaturated soybean oil fatty acids, canola oil fatty acids, cottonseed oil fatty acids, corn oil fatty acids, peanut oil fatty acids, palm kernel oil fatty acids, or coconut oil fatty acids, glucose tetraoleate, the glucose tetraesters of coconut oil or unsaturated soybean oil fatty acids, the mannose tetraesters of mixed soybean oil fatty acids, the galactose tetraesters of oleic acid, the arabinose tetraesters of linoleic acid, xylose tetralinoleate, galactose pentaoleate, sorbitol tetraoleate, the sorbitol hexaesters of unsaturated soybean oil fatty acids, xylitol pentaoleate, and mixtures thereof.

The liquid polyol fatty acid polyesters suitable for use herein can be prepared by a variety of methods known to those skilled in the art. These methods include: transesterification of the polyol (i.e. sugar or sugar alcohol) with methyl, ethyl or glycerol fatty acid esters using a variety of catalysts; acylation of the polyol with a fatty acid chloride; acylation of the polyol with a fatty acid anhydride; and acylation of the polyol with a fatty acid, per se. See, for example, U.S. Pat. Nos. 2,831,854, 3,600,186, 3,963,699, 4,517,360 and 4,518,772, all of which are incorporated by reference, which disclose suitable methods for preparing polyol fatty acid polyesters.

Specific, but nonlimiting, examples of the preparation of liquid polyol fatty acid polyesters suitable for use in the practice of the present invention are as follows.

Erythritol tetraoleate: Erythritol and a five-fold molar excess of methyl oleate are heated at 180° C. under vacuum, with agitation, in the presence of sodium methoxide catalyst over two reaction periods of several hours each. The reaction product (predominately erythritol tetraoleate) is refined in petroleum ether and crystallized three times from several volumes of acetone at 1° C.

Xylitol pentaoleate: Xylitol and a five-fold molar excess of methyl oleate in dimethylacetamide (DMAC) solution are heated at 180° C. for five hours in the presence of sodium methoxide catalyst, under vacuum. During this time the DMAC is removed by distillation. The product (predominately xylitol pentaoleate) is refined in petroleum ether solution and, after being freed of petroleum ether, is separated as a liquid layer four times from acetone at about 1° C. and twice from alcohol at about 1° C.

Sorbitol hexaoleate is prepared by essentially the same procedure used to prepare xylitol pentaoleate except that sorbitol is substituted for xylitol.

Sucrose octaoleate is prepared by substantially the same procedure as that used to prepare erythritol tetraoleate except that sucrose is substituted for erythritol.

Sucrose hepta- and octaesters of soybean oil fatty acids: Soybean oil is partially hydrogenated to an iodine value of 107 and then converted to the respective methyl esters. These methyl esters are then reacted with sucrose in the presence of a potassium carbonate catalyst and the potassium soap of the soybean oil fatty acids.

Sucrose hepta- and octaesters of canola oil fatty acids: Canola oil is partially hydrogenated to an iodine value of 90 and then converted to the respective methyl esters. These methyl esters are then reacted with sucrose at about 135° C. in the presence of a potassium carbonate catalyst and the potassium soap of the canola oil fatty acids. See Example 1 of U.S. Pat. No. 4,517,360 to Volpenhein, issued May 14, 1985.

Sucrose hepta- and octaesters of palm kernel oil fatty acids: Palm kernel oil (hydrogenated to an iodine value of about 4) is converted to the respective methyl esters. These methyl esters are then reacted with sucrose at about 135° C. in the presence of a potassium carbonate catalyst and the potassium soap of the palm kernel oil fatty acids. See Example 1 of U.S. Pat. No. 4,517,360 to Volpenhein, issued May 14, 1985.

The solid polyol fatty acid polyesters useful in the nondigestible fat component of the present invention are solid at temperatures of about 37° C. and higher, and preferably are solid at temperatures of about 50° C. and higher, and most preferably at temperatures of about 6° C. or higher. (Melting points reported herein are measured by Differential Scanning Calorimetry (DSC)). These solid polyol polyesters have the ability to bind high levels of edible liquid nondigestible oils, such as liquid polyol polyesters previously described, even when included at relatively low levels, e.g., from about 1 to about 9%. This high capacity to bind liquid nondigestible oils enables the solid polyol polyesters to control or prevent the passive oil loss problem associated with the ingestion of such liquid oils.

The solid polyol fatty acid polyesters useful in the present invention comprise a polyol having at least 4 (preferably from 4 to 11, more preferably from 4 to 8, most preferably 6 to 8) hydroxyl groups which have been esterified with certain mixed fatty acid ester groups. Suitable polyols include sugars, sugar alcohols, alkyl glycosides, pentaerythritol, polyglycerols such as diglycerol and triglycerol and polyvinyl alcohols. Preferred solid polyol fatty acid polyesters are selected from solid sugar fatty acid polyesters, solid sugar alcohol fatty acid polyesters and mixtures thereof. With regard to the solid polyol polyesters, suitable sugars and sugar alcohols include the monosaccharides, disaccharides, and trisaccharides, as well as the respective alcohol reduction products of these sugars. Preferred sugars or sugar alcohols contain 4 to 8 (most preferably from 6 to 8) hydroxyl groups prior to esterification. Examples of suitable monosaccharides, disaccharides and trisaccharides include those previously defined for the liquid polyol polyesters, with sucrose being a particularly preferred polyol.

The solid polyol fatty acid polyesters used in the present invention contain ester groups comprising a combination of: (a) long chain unsaturated fatty acid radicals, short chain saturated fatty acid radicals or mixtures thereof; and (b) at least about 15%, preferably at least about 30%, more preferably at least about 50%, most preferably at least about 60%, long chain saturated fatty acid radicals. Suitable unsaturated fatty acid radicals contain at least 12, preferably from 12 to 26, more preferably from 18 to 22, most preferably 18, carbon atoms. Suitable short chain saturated fatty acid radicals contain from 2 to 12, preferably from 6 to 12, and most preferably from 8 to 12, carbon atoms. Suitable long chain saturated fatty acid radicals contain at least 20, preferably from 20 to 26, most preferably 22, carbon atoms. The long chain unsaturated fatty acid radicals can be used singly or in mixtures with each other, in all proportions, as is also the case with the short chain and long chain saturated fatty acid radicals. In addition, straight chain (i.e. normal) fatty acid radicals are typical for the short chain and long chain saturated fatty acid radicals, as well as the long chain unsaturated fatty acid radicals.

The molar ratio of long chain unsaturated fatty acid radicals or short chain saturated fatty acid radicals or mixtures thereof, to long chain saturated fatty acid radicals, is from about 1:15 to about 2:1. Preferably, this molar ratio is from about 1:7 to about 5:3, most preferably from about 1:7 to about 3:5. The average degree of esterification of these solid polyol fatty acid polyesters with these mixtures of fatty acid radicals is such that at least 4 of the hydroxyl groups of the polyol are esterified. In the case of solid sucrose polyesters, from about 7 to 8 of the hydroxyl groups of the polyol preferably are esterified. Typically, substantially all (e.g., at least about 85%, preferably at least about 95%) of the hydroxyl groups of the polyol are esterified.

Examples of suitable long chain unsaturated fatty acid radicals for use in these solid polyol polyesters are monounsaturated radicals such as lauroleate, myristoleate, palmitoleate, oleate, elaidate, and erucate, and polyunsaturated radicals such as linoleate, arachidonate, linolenate, eicosapentaenoate, and docosahexaenoate. In terms of oxidative stability, the monounsaturated and diunsaturated fatty acid radicals are preferred. Examples of suitable short chain saturated fatty acid radicals are acetate, butyrate, hexanoate (caproate), octanoate (caprylate), decanoate (caprate), and dodecanoate (laurate). Examples of suitable long chain saturated fatty acid radicals are eicosanoate (arachidate), docosanoate (behenate), tetracosanoate (lignocerate), and hexacosanoate (cerotate).

Mixed fatty acid radicals from oils which contain substantial amounts of the desired long chain unsaturated fatty acids, short chain saturated fatty acids, or long chain saturated fatty acids can be used as sources of fatty acid radicals in preparing the solid polyol polyesters useful in the present invention. The mixed fatty acids from such oils should preferably contain at least about 30% (more preferably at least about 50%, most preferably at least about 80%) of the desired long chain unsaturated, short chain saturated or long chain saturated fatty acids. For example, palm kernel oil fatty acids can be used instead of a mixture of the respective pure saturated fatty acids having from 8 to 12 carbon atoms. Similarly, rapeseed oil fatty acids or soybean oil fatty acids can be used instead of a mixture of the respective pure monounsaturated and polyunsaturated fatty acids having 12 to 26 carbon atoms, and hardened (i.e., hydrogenated) high erucic rapeseed oil fatty acids can be used in place of a mixture of the respective pure long chain saturated fatty acids having from 20 to 26 carbon atoms. Preferably, the $C_{20}$ or higher saturated fatty acids (or their derivatives, e.g. methyl esters) are concentrated, for example, by distillation. An example of source oils for these solid polyol polyesters are high oleic sunflower oil and substantially completely hydrogenated high erucic rapeseed oil. When sucrose is substantially completely esterified with a 1:3 by weight blend of the methyl esters of these two oils, the resulting polyester has a molar ratio of unsaturated $C_{18}$ acid radicals to saturated $C_{20}$ or higher acid radicals of about 1:1, the saturated $C_{20}$ and $C_{22}$ acid radicals being about 28.6% of the total fatty acid radicals. The higher the proportion of the desired long chain unsaturated/short chain saturated and long chain saturated fatty acids in the source oils used in making the solid polyol polyesters, the more efficient the polyesters will be in their ability to bind the liquid nondigestible oils.

Examples of solid polyol fatty acid polyesters useful in the present invention include sucrose tetrabehenate tetracaprylate, sucrose pentabehenate trilaurate, sucrose hexabehenate dicaprylate, sucrose hexabehenate dilaurate, the sorbitol hexaester of palmitoleic and arachidic fatty acid radicals in a 1:2 molar ratio, the raffinose octaester of linoleic and behenic fatty acid radicals in a 1:3 molar ratio, the maltose heptaester of a mixture of sunflower oil and lignoceric fatty acid radicals in a 3:4 molar ratio, the sucrose octaester of oleic and behenic fatty acid radicals in a 2:6 molar ratio, the sucrose octaester of lauric, linoleic and behenic fatty acid radicals in a 1:3:4 molar ratio, and the sucrose hepta- and octaesters of $C_{18}$ mono- and/or diunsaturated fatty acid radicals and behenic fatty acid radicals in a molar ratio of unsaturated:behenic acid radicals of about 1:7 to 3:5.

The solid polyol fatty acid polyesters of the present invention can be made according to prior known methods for preparing polyol polyesters. Since the sucrose polyesters are the preferred solid polyol polyesters for use in the present invention, such preparation will be exemplified primarily by these materials. One such method of preparation is by reacting the acid chlorides or acid anhydrides of the respective fatty acids with sucrose, preferably using a sequential esterification process. In this sequential esterification process, sucrose is initially partially esterified with the long chain unsaturated/short chain saturated acid chlorides, followed by complete or substantially complete esterification of this initial reaction product with the long chain saturated fatty acid chlorides, in that order, or in the reverse order. See U.S. application Ser. No. 417,990, to James C. Letton, filed Oct. 6, 1989 (herein incorporated by reference), which discloses this sequential esterification process.

Another method for preparing these solid polyol polyesters is by the process of reacting the methyl esters of the respective fatty acids with sucrose in the presence of a fatty acid soap and a basic catalyst such as potassium carbonate. See, for example, U.S. Pat. No. 3,963,699 to Rizzi et al, issued Jun. 15, 1976, U.S. Pat. No. 4,518,772 to Volpenhein, issued May 21, 1985, and U.S. Pat. No. 4,517,360 to Volpenhein, issued May 14, 1985, all of which are incorporated by reference. When using the methyl ester route for preparing the solid polyol polyesters having mixed short chain and long chain saturated fatty acid radicals, the octaester of one of the types of fatty acids (i.e., short chain saturated fatty acids, or long chain saturated fatty acids) can be prepared first, followed by partially interesterifying this initial reaction product with the methyl ester of the other type of fatty acid. In a preferred way of practicing this methyl ester process, the methyl esters of the long chain saturated fatty acids are reacted with sucrose in a first stage at about 135° C. to obtain partial esters of sucrose. The methyl esters of the short chain saturated fatty acids are then added to the reaction and the temperature is dropped to 90°–120° C., as necessary, and reflux is maintained by adjusting pressure and/or temperature to keep the methyl esters of the short chain fatty acids in the reactor. Reflux is maintained until the desired degree of esterification has been reached.

When using the methyl ester route to prepare solid polyol polyesters having mixed long chain unsaturated and saturated fatty acid radicals, the unsaturated and saturated methyl esters are blended in the desired ratio and reacted with sucrose by transesterification to obtain the sucrose esters of mixed unsaturated/saturated fatty acids. In a preferred way of practicing this process, five moles of the blended saturated/unsaturated methyl esters are reacted with sucrose in a first stage at 135° C. to obtain partial esters of sucrose. An additional nine moles of the blended esters are then added and the reaction continued at 135° C. under reduced pressure until the desired degree of esterification has been reached.

Specific, but nonlimiting, examples of the preparation of solid polyol fatty acid polyesters suitable for use in the practice of the present invention are as follows:

1. Sucrose Tetrabehenate Tetracaorylate

Seven grams of sucrose (anhydrous) is dissolved by warming in a mixture of 150 ml pyridine and 75 ml of dimethylformamide (DMF). Both solvents are predried over 3 Å molecular sieves.

Thirty grams of the acid chloride of behenic ($C_{22}$) acid are dissolved in 100 ml of dichloromethane and the acid chloride solution added dropwise to the sucrose solution. The reaction temperature is held at 32° C. by use of a cold water bath. Addition time is 30 minutes.

After addition of the $C_{22}$ acid chloride, the reaction mixture is warmed to 40° C., removed from the water bath and allowed to stir at ambient temperature for four additional hours.

After four hours of reaction time, 15 grams of caprylyl chloride in 50 ml of dichloromethane is added. Addition time is 30 minutes and the reaction temperature is maintained at 30°–35° C. After addition of the caprylyl chloride, the reaction mixture is allowed to stir overnight.

After stirring overnight, the reaction mixture is diluted with 30 ml of methanol to convert excess acid chlorides to their methyl esters. The reaction mixture is then diluted with 300 ml of dichloromethane and combined in a separatory funnel with 300 ml of a dilute salt (NaCl) solution. The mixture is shaken then allowed to separate.

The organic (dichloromethane) layer is washed a second time with a dilute salt solution followed by washing with dilute HCl (to remove residual pyridine), then with water until the last wash is neutral to pH paper.

The dichloromethane solution is dried over anhydrous sodium sulfate then stripped under vacuum with heating to a liquid residue. The product solidifies on standing. The solid product is melted in a hot water bath then extracted three times with methanol (the methanol layers are removed by decantation).

The reaction product is stripped again under vacuum and the residue dissolved in 80 ml of dichloromethane. The solution is stirred and 80 ml of methanol are slowly added to induce crystallization. The mixture is again vacuum distilled to displace the dichloromethane with additional methanol added during distillation. A white precipitte (crystalline) forms and the suspension is cooled in a water bath then filtered to give 40.5 grams of dried product.

a. Yield—93% of theoretical
b. Hydroxyl value—3.1
c. Average degree of esterification—7.88 (calculated from hydroxyl value as an approximation)
d. Estimated % octaester—90.6

2. Sucrose Pentabehenate Trilaurate

Step A—Preparation of Potassium Stearate 44.8 grams of methyl stearate (0.75 moles/mole of sucrose to be used in Step B) is saponified by stirring at reflux in 200 ml methanol containing an equivalent amount of KOH (9.4 grams of 90% purity). The reaction is stirred at 60° C. for about an hour with heating until all methyl ester has been converted to soap as indicated by infrared analysis. The soap solution is used, as is, in the next reaction step.

Step B—Preparation of Lower Sucrose Esters 354 grams of methyl behenate (5 moles/mole of sucrose) is added directly to the potassium stearate-methyl alcohol solution from Step A above. 68.4 grams of sucrose (anhydrous) and 2.76 grams potassium carbonate are then added to the soap-methyl behenate mixture. The reaction is then heated to 135° C. to remove the methanol.

When the temperature reaches 135° C., the reaction mixture is placed under vacuum (about 2 mmHg). The reaction is allowed to proceed for about 1.5 hours until the sucrose is converted to its lower sucrose esters.

Step C—Preparation of $C_{12}-C_{22}$ Sucrose Polyesters

The lower sucrose behenate ester crude (from Step B above), 177 gram of methyl behenate, and 192.6 grams of methyl laurate are combined with 2.76 grams of potassium carbonate in a reactor. While stirring, the temperature is dropped to 120° C. and the reactor placed under vacuum. The reflux is maintained to keep methyl laurate in the reactor by adjusting pressure with a nitrogen release valve. The reaction is allowed to proceed until the desired end point. The end point is determined by HPLC (High Pressure Liquid Chromatography).

Step D—Finished Process of $C_{12}-C_{22}$ Sucrose Polyesters

The reaction mixture is cooled to 90° C. and 20 ml of $H_2O$ is added to form the hydrate of the soap. The soap separates as a sludge and is removed by centrifugation.

The crude $5C_{22}/3C_{12}$ sucrose polyester is then decolorized with a mixture (2% by weight) of Filtrol and Celite. The mixture is stirred at 60° C. with a nitrogen sparge for 30 minutes and the bleaching earths removed by vacuum filtration. Excess and/or residual methyl esters are removed by thin film evaporation at 240° C., 0.2 mmHg. The product is then steam stripped at 210° C. and 1 mmHg for 3 hours to get the final product.

a. Yield—66% of theoretical.
b. % Octaester (HPLC)—89.5
c. Average degree of esterification—7.89 (calculated from % octaester value as an approximation.)

3. Sucrose Tetraoleate Tetrabehenate 10 g of sucrose are dissolved in a solution of 150 ml pyridine and 75 ml dimethylformamide by heating to about 55° C. while under a nitrogen atmosphere. The solution is cooled to about 40° C. and a solution of 41.8 g of behenyl chloride in 150 ml of dichloromethane is added dropwise over a period of 1 hour and 45 minutes. Temperature during the addition is maintained at about 40°–44° C., and the system is also maintained under a nitrogen atmosphere.

Following addition of the behenyl chloride, the reaction is stirred at 40° C. for an additional 3 hours, then cooled to 30° C. 38 g of oleyl chloride in 100 ml of dichloromethane are then added dropwise over a 45 minute period. The reaction temperature is maintained at about 30° C. during this addition period, then raised to 40° C. and held at that temperature for about 1 hour and 30 minutes. Heat is then discontinued and the reaction mixture stirred at ambient temperature overnight.

The reaction mixture is then warmed to 40° C. and stirred at 40° C. for one hour before cooling to room temperature (about 27° C.). The mixture is then filtered to remove crystalline pyridine hydrochloride and the filtrate is stripped under vacuum to remove dichloromethane, pyridine, and dimethylformamide. The distillation residue is then re-dissolved in dichloromethane and the solution transferred to a 2-liter separatory funnel.

The dichloromethane solution is then washed two times with a dilute solution of sodium chloride, then with a dilute solution of hydrochloric acid to remove residual pyridine. The dichloromethane solution is then washed two times with water, then with dilute calcium hydroxide solution. The dichloromethane/water mixture is then filtered through Celite to remove a small amount of precipitate (probably calcium salts of the acids), then the mixture is separated in a 2-liter separatory funnel. The dichloromethane solution is then washed neutral with water and the dichloromethane solution is dried over magnesium sulfate for several days. The dried mixture is then filtered and stripped under vacuum to give a residue which solidifies at room temperature. The solid has a complete melting point of 43°–45° C., and a hydroxyl value of 5.7 (corresponding to a calculated degree of esterification of 7.73—about 93% of hydroxyl groups esterified). The percent octaester in the material is 83.

4. Sucrose Polyester of Hydrogenated Rapeseed/Cottonseed Oil and Sunflower Oil Fatty Acids High erucic acid rapeseed oil (HEAR) is blended with low erucic acid rapeseed oil (LEAR) to a composition of 38% erucic acid. The rapeseed oil blend is mixed with 3%-6% refined, bleached cottonseed oil to obtain an oil composition having approximately 35% of $C_{22}$ acids (i.e., behenic plus erucic). This rapeseed/cottonseed stock is then hydrogenated to an iodine value less than 4. Hydrogenation is done with nickel catalyst levels typical of any vegetable oil using 0–100 psig pressure, and a temperature of approximately 375° F.

The material is deodorized at a temperature of 375°–495° F. The hardened, deodorized rapeseed/cottonseed oil has the following characteristics: fatty acid composition: 3-7% $C_{16:0}$, 45-55% $C_{18:0}$, 0-2% $C_{18:1}$, 0-1% $C_{18:2}$, 4-8% $C_{20:0}$, 33-37% $C_{22:0}$, 0-1% $C_{22:1}$, 0-2% $C_{24:0}$. Free fatty acid content is 0.01-0.1% and Lovibond red color is about 1.0.

The rapeseed/cottonseed oil is converted into methyl esters through an esterification process in which the oil is mixed with methanol, a sodium methoxide catalyst is added, and the reaction is continued until all the triglycerides are converted into methyl esters. Glycerine is settled by gravity after the reaction is completed. The esters are then water washed with hot water to remove trace levels of glycerine and soap. The water phase is settled out by gravity after each wash.

The esters are flash distilled in a batch mode to both remove unsaponifiable materials and to obtain a more concentrated $C_{22}$ material. The distillation is done under a vacuum of 0.5-2 mm Hg and a temperature of 300°–410° F. The last 10%–15% of the esters distilled are collected into a clean vessel for use in making the desired sucrose polyester. The other 85-90% is discarded. The ester composition of the last 10-15% collected is: 4% $C_{18:0}$, 6% $C_{20:0}$, 87% $C_{22:0}$, 3% $C_{24:0}$. These are esters "A".

Refined and bleached sunflower oil is deodorized at a temperature of 375°–495° F. under vacuum. The deodorized sunflower oil has the following characteristics: Iodine Value: 125-140; fatty acid composition: 5-10% $C_{16:0}$, 2-6% $C_{18:0}$, 19-26% $C_{18:1}$, 63-74% $C_{18:2}$, 0-2% $C_{18:3}$, 0-1% $C_{20:0}$, 0-1% $C_{22:0}$. Free fatty acid content is 0.01-0.1% and Lovibond red color is about 1.3.

The sunflower oil is converted into methyl esters through the same esterification process as described above. The esters are flash distilled in a batch mode, primarily to remove unsaponifiable materials. The distillation is done under a vacuum of 0.5-2.0 mm Hg and a temperature of 300°–410° F. These are esters "B".

About 70.5 Kg of methyl esters of refined soybean oil fatty acid, hardened to an IV of about 2, are mixed with 209 Kg of methanol and 15.4 Kg of potassium hydroxide in a stainless steel batch reactor. The mixture is heated to about 145° F. (63° C.) with agitation for 1 to 3 hours at atmospheric pressure. During this time, all but a residual amount of the methyl esters are saponified to make soap.

About 1193.6 Kg of ester "A" is blended with 241.4 Kg of ester "B" to make ester blend "C". The ester composition of blend "C" is about: 1.2% $C_{16:0}$, 3.8% $C_{18:0}$, 3.8% $C_{18:1}$, 10.7% $C_{18:2}$, 4.7% $C_{20:0}$, 71.9% $C_{22:0}$, 3% $C_{24:0}$. About 545.5 Kg. of ester "C" are added to the previously made soap mixture.

About 104.5 Kg of granular sucrose is then added to give a 5:1 molar ratio of methyl ester to sucrose. Potassium carbonate is then added to the mixture (approx. 0.5 wt. percent of the reaction mix) to catalyze the transesterification. This mixture is agitated and slowly heated at atmospheric pressure until the temperature reaches about 275° F. (135° C.). This is to remove the methanol. A vacuum is then pulled and the mixture agitated for up to 8 hours to form the mono-, di- and trisucrose esters. Small quantities of tetra- and pentaesters are also formed during this stage. Additional methyl ester "C" (890 Kg) which has been preheated to 275° F. (135° C.) is added to bring and maintain the molar ratio of the esters to sucrose to 14-15:1. Additional potassium carbonate is then added twice to the mixture (each addition being approximately 0.5 wt. percent of the initial reaction mix). When the reaction conditions stabilize at 275° F. (135° C.), a nitrogen sparge is used to improve agitation and promote methanol stripping. This second reaction stage lasts approximately 4 to 13 hours.

The reaction mixture is then cooled under nitrogen to between 149° F. (65° C.) and 185° F. (85° C.). The crude reaction mixture is agitated with about 91 Kg water. The hydrated crude reaction mixture is passed through a centrifuge to separate a heavy and a light phase. The heavy phase which contains the soaps, excess sugars and potassium carbonate is discarded. The light phase is then washed with an additional 264 Kg of water.

The light phase, which contains methyl esters and the sucrose polyester is then dried to remove moisture at 170° F.–190° F. (76° C.–88° C.) under 70 mm Hg or less vacuum for 30 to 60 minutes. Filtrol 105 (1.0 wt. percent) is added and the mix is agitated at 167° F. (75° C.) to 190° F. (88° C.) The slurry is separated by filtration or other means until there is less than 0.1 wt. percent fines. The liquid is then passed through a 1 micromillimeter filter.

The refined and bleached reaction mix is then passed through a stainless steel wiped-film evaporator or other suitable equipment to distill off the bulk of the methyl esters. The distillation takes place at 392° F. (200° C.) to 455° F. (235° C.) under approximately 0.5 mm Hg of vacuum.

The sucrose polyester is then deodorized by passing downward through a stainless steel packed column deodorizer or other suitable device at 392° F. (200° C.) to 450° F. (232° C.) under a vacuum of less than about 25 mm Hg. Steam is introduced to the bottom of the column and passes counter-currently to the sucrose polyester. Feed rates and temperature are adjusted until the methyl ester content of the sucrose polyester is below 1000 ppm. The mixture is then cooled to between 149° F. (65° C.) to 185° F. (85° C.) and passed through a 1 micromillimeter filter. The sucrose polyester is stored in clean stainless steel drums.

The sucrose polyester made according to this procedure has the following approximate composition and properties:

| Fatty Acid Composition | |
| --- | --- |
| $C_{16:0}$ | 1.2% |
| $C_{17:0}$ | 0 |
| $C_{16:1}$ | 0 |
| $C_{18:0}$ | 4.6 |
| $C_{18:1}$ | 3.7 |
| $C_{18:2}$ | 10.9 |
| $C_{18:3}$ | 0 |
| $C_{20}$ | 4.6 |

| -continued | |
|---|---|
| $C_{20:1}$ | 0 |
| $C_{22:0}$ | 71.7 |
| $C_{22:1}$ | 0.2 |
| $C_{24:0}$ | 2.8 |
| Other | 0.4 |
| Iodine Value | 22.4 |
| Complete Melting Point | 70.4° C. |
| Ester Distribution | |
| Octa | 71.6% |
| Hepta | 28.2 |
| Hexa | 0.2 |
| Penta | <0.1 |
| Lower | <0.1 |

By varying the fatty acid composition of ester "A" and/or ester "B", and/or varying the ratio of ester"A" and ester"B" in preparing ester "C", this process can be used to make other solid sucrose polyesters.

In addition to the nondigestible fat component, the fat compositions of the present invention can optionally include a digestible triglyceride fat or oil. Generally, fat compositions of the present invention can comprise from 0 to about 90% of such triglyceride fats or oils. Preferably, the fat compositions of the present invention comprise from 0 to about 65%, more preferably from 0 to about 50%, and most preferably from 0 to about 25%, of such triglyceride fats or oils. Because of the potential caloric impact of these triglyceride fats and oils, it is desirable to minimize the level at which they are included in the fat compositions of the present invention.

As used herein, the term "triglyceride oil" refers to those triglyceride compositions which are fluid or liquid above about 25° C. Although not a requirement, the triglyceride oils useful in the present invention can include those which are fluid or liquid below 25° C. These triglyceride oils consist primarily of triglyceride materials, but can also include residual levels of other components such as mono- and diglycerides. To remain fluid or liquid at temperatures below 25° C., the triglyceride oil contains a minimal amount of glycerides having melting points higher than about 25° C. so as to limit the solids increase when the triglyceride oil is cooled. It is desirable that the triglyceride oil be chemically stable and resistant to oxidation.

Suitable triglyceride oils can be derived from naturally occurring liquid vegetable oils such as cottonseed oil, soybean oil, safflower oil, corn oil, olive oil, coconut oil, palm kernel oil, peanut oil, rapeseed oil, canola oil (i.e., rapeseed oil low in erucic acid), sesame seed oil, sunflower seed oil, and mixtures thereof. Also suitable are liquid oil fractions obtained from palm oil, lard and tallow by, for example, graining or directed interesterification, followed by separation of the oils. Oils predominating in glycerides of unsaturated acids can need some hydrogenation to maintain flavor, but care should be taken not to greatly increase the amount of glycerides melting above 25° C. When oils are selected which have a larger amount of solids melting between 25° and 40° C. than are desirable, it can be necessary to separate out the solids. For example, refined and slightly hydrogenated soybean oil is suitable, as well as refined cottonseed oil.

As used herein, the term "triglyceride fat" refers to those triglyceride compositions which are solid or plastic above about 25° C. These solid or plastic fats can be derived from plants or animals or can be edible synthetic fats or oils. For example, animal fats such as lard, tallow, oleo oil, oleo stock, oleo stearin and the like which are solid at room temperature can be utilized. Also, triglyceride oils, e.g. unsaturated vegetable oils, can be converted into plastic fats by partial hydrogenation of the unsaturated double bonds of fatty acid constituents of the oil followed by conventional chilling and crystallization techniques or by proper mixture with sufficient triglycerides which are solid at room temperature to form a rigid interlocking crystalline structure which interferes with the free-flowing properties of the liquid oil. See U.S. Pat. No. 3,355,302 to Purves et al, issued Nov. 28, 1967, and U.S. Pat. No. 3,867,556 to Darragh et al, issued Feb. 18, 1975 (herein incorporated by reference), for further examples of solid or plastic fats. Because the solid or plastic fats add an appreciable level of solids to the fat compositions of the present invention, their inclusion can cause adverse effects on the organoleptic properties, in particular waxiness and flavor display, of potato chips or other low moisture foods containing these compositions.

Triglyceride fats and oils useful in the fat compositions of the present invention can include certain triglycerides in which one, two or three of the OH groups of the glycerol molecule have been substituted with acetyl, propionyl, butyryl, caproyl, caprylyl, or capryl radicals, and the remaining OH groups of the glycerol molecule (if any) have been substituted with acyl radicals of saturated or unsaturated fatty acids having from 12 to 24 carbon atoms.

Various other ingredients typically included in fat products can also be included in fat compositions of the present invention. These other ingredients include stabilizers to help protect against oxidative deterioration at high temperatures. Silicone oils, particularly methyl and ethyl silicone oils, are useful for this purpose. Methyl silicones have also proven effective in reducing the rate of oil polymerization during frying. Other additives typically included in fat products such as minor amounts of optional flavorings, emulsifiers, anti-spattering agents, anti-sticking agents, antioxidants or the like can also be present.

The fat compositions of the present invention can also be fortified with vitamins and minerals, particularly the fat-soluble vitamins. The fat-soluble vitamins include vitamin A, vitamin D, and vitamin E. See U.S. Pat. No. 4,034,083 to Mattson (herein incorporated by reference) which discloses fat-soluble vitamins useful in fortifying polyol fatty acid polyesters.

The fat compositions of the present invention can also include noncaloric or reduced calorie sweeteners alone or in combination with bulking agents. These noncaloric or reduced calorie sweeteners include, but are not limited to, aspartame, saccharin, alitame, thaumatin, dihydrochalcones, acesulfame, and cyclamates.

Bulking or bodying agents which can be useful in the fat compositions of the present invention include partially or wholly nondigestible carbohydrates, for example, polydextrose and cellulose or cellulose derivatives, such as carboxymethylcellulose, carboxyethylcellulose, hydroxypropylcellulose, methylcellulose, hydroxypropyl methylcellulose, and microcrystalline cellulose. Other suitable bulking agents include gums (hydrocolloids), starches, dextrins, fermented whey, tofu, maltodextrins, polyols, including sugar alcohols, e.g., sorbitol and mannitol, and carbohydrates, e.g., lactose.

The fat compositions of the present invention can include dietary fibers. By "dietary fiber" is meant complex carbohydrates resistant to digestion by mammalian enzymes, such as the carbohydrates found in plant cell walls and seaweed, and those produced by microbial fermentation. Examples of these complex carbohydrates are brans, celluloses, hemicelluloses, pectins, gums and mucilages, seaweed extract, and biosynthetic gums. Sources of the cellulosic fiber include vegetables, fruits, seeds, cereals, and man-made fibers (for example, by bacterial synthesis). Commercial fibers such as purified plant cellulose, or cellulose flour, can also be used. Naturally occurring fibers can be used, such as psyllium and fibers from whole citrus peel, citrus albedo, sugar beets, citrus pulp and vesicle solids, apples, apricots, and watermelon rinds.

These dietary fibers can be in a crude or purified form. The dietary fiber used can be of a single type (e.g., cellulose), a composite dietary fiber (e.g., citrus albedo fiber containing cellulose and pectin), or some combination of fibers (e.g., cellulose and a gum). The fibers can be processed by methods known to the art.

C. Foods Containing Fat Compositions

The present invention also relates to potato chips and other low moisture foods containing the fat compositions described in part B of this application. As used herein, the term "low moisture food" refers to a food having nonfat ingredients (e.g. carbohydrates, protein, etc.) and having an end product moisture content typically of about 10% or less, preferably about 5% or less, more preferably about 3% or less, most preferably about 2% or less, i.e. is typically crisp. This end product moisture content can be achieved before or after treatment with the fat composition. For example, in the case of potato chips, this moisture content would be achieved as a result of frying in the fat composition. The fat compositions of the present invention can be applied to the exterior surface of these low moisture foods (i.e., fat-coated foods), incorporated into the interior thereof, such as in the case of mixing with the other food ingredients, or incorporated into the food, followed by application to the exterior surface thereof.

The present invention particularly relates to potato chips and other low moisture foods that are coated with these fat compositions. As used herein, the term "fat-coated foods" refers to foods prepared by applying the fat compositions of the present invention to all or a portion of the surface thereof. These fat compositions can be applied by a variety of means including immersing, dipping, soaking, spraying, blowing, pouring, pan coating (e.g., in a revolving pan), tumble coating, brushing, applying with a roller, rolling around in a container of fat composition, falling film methods, enrobing and curtain coating. The fat composition can be heated during application to the food, such as in the case of frying. If desired, the fat compositions of the present invention can be applied to the surface of the food, followed by heating, such as baking in the case of baked foods. The fat composition can also be applied to the surface of a food which already contains fat. Once applied to the surface, the fat composition is typically absorbed into the interior of the food, such as in the case of potato chips, corn chips and tortilla chips.

The fat compositions of the present invention are particularly useful in the preparation of fried foods such as potato chips. The method for frying potato chips and other foods comprises immersing these foods in a fat composition of the present invention that is heated to the appropriate temperature, for an appropriate period of time. The particular temperatures and times for frying will depend on the particular food that is involved, the moisture content desired in the resulting fried food, the product appearance desired, the texture desired, and the amount of fat absorption desired. In the case of potato chips, the potato slices or fabricated potato pieces are immersed in a fat composition heated to a temperature of from about 300° to about 400° F. (from about 148.9° to about 204.4° C.), preferably from about 340° to about 400° F. (from about 171.1° to about 204.4° C.), most preferably from about 350° to about 380° F. (from about 176.7° to about 193.3° C.), for a period of time sufficient to achieve a moisture content of about 3% or less in the potato chips. In the case of corn chips or tortilla chips, the chips are immersed in a fat composition heated to a temperature of from about 350° to about 420° F. (from about 176.7° to about 215.6 C.), preferably from about 370° to about 410° F. (from about 187.8° to about 210° C.), most preferably from about 370° to about 390° F. (from about 187.8° , to about 198.9° C.), for a period of time sufficient to achieve a moisture content of about 3% or less in the corn/tortilla chips. Agitation of the fat composition by mechanical or fluid means is desirable to provide fried foods having a more consistent doneness throughout.

The fat compositions of the present invention are particularly useful in the preparation of potato chips from either potato slices or fabricated potato pieces that have been fried in these compositions. As used herein, the term "potato slices" refers to slices which have been cut from whole potatoes. As used herein, the term "fabricated potato pieces" refers to potato pieces obtained from a dough sheet formed from mashed potatoes or reconstituted mashed potatoes (i.e. dried mashed potatoes in the form of flakes and/or granules to which water has been added). In addition to potato chips, the fat compositions of the present invention are useful in the preparation of other fried or baked salted snacks such as corn chips, tortilla chips, potato sticks, popcorn, nuts, sweet snacks, corn curls and corn puffs, pellet snacks, half products, and other extruded snacks based on corn or other cereal grains such as wheat, rice, and the like. Other foods for which the fat compositions of the present invention can be useful include crackers and fruit slices.

D. ANALYTICAL METHODS

1. Thixotrooic Area of Fat Composition a. Tempering of Sample

A 5 to 10 gram sample of the fat composition is heated to about 190° F. (87.8° C.) to melt it. The melted sample is poured into an aluminum weighing dish and then heated to a temperature of at least about 240° F. (115.6° C.) using a hotplate. The heated sample is then placed on a surface cooled by a refrigerated bath set at 40° F. (4.4° C.). The sample is then cooled gradually, with agitation, over a period of 3 minutes to 85° F. (29.4° C.), using a thermocouple and calibrated chart recorder to monitor the rate of temperature decrease. The cooled sample is then tempered for 1 week at 70° F. (21.1° C.).

b. Measurement

The thixotropic area of the fat compositions of the present invention is determined by a rheological measurement of the tempered sample while being subjected to different rates of shear. A Contraves Rheomat 115 rheometer is used with a cone and plate orientation. The sample of the fat composition is deposited on the plate of the rheometer after the temperature of the plate surface has equilibrated to 92° F. (33.3° C.), using a temperature-controlled recirculating bath. The torque motor and cone head are then brought down slowly onto the sample, making sure that the sample spreads to completely cover the cone surface (a slight excess being acceptable). The rheometer then ramps up from a shear rate of 0 sec.$^{-1}$ to a shear rate of 800 sec.$^{-1}$ in 2 minutes and then ramps back down to a shear rate of 0 sec.$^{-1}$ in 2 minutes. A variety of rheological measurements can be calculated from a plot of the shear rate versus the shear stress. In the case of thixotropic area, the area encompassed by the hysteresis "loop" on the plot is calculated.

2. Fatty Acid Composition of Polyol Polyesters

The fatty acid composition (FAC) of the polyol polyesters is determined by gas chromatography, using a Hewlett-Packard Model S712A gas chromatograph equipped with a thermal conductivity detector and a Hewlett-Packard Model 7671A automatic sampler. The chromatographic method used is described in *Official Methods and Recommended Practices of the American-Oil Chemists Society*, 3rd Ed., 1984, Procedure 1-$C_e$62.

3. Ester Distribution of Sucrose Polyesters

The relative distribution of the individual octa-, hepta-, hexa- and penta- esters, as well as collectively the tetra- through mono- esters, of the sucrose polyesters can be determined using normal-phase high performance liquid chromatography (HPLC). A silica gel-packed column is used in this method to separate the polyester sample into the respective ester groupings noted above. Hexane and methyl-t-butyl ether are used as the mobile phase solvents. The ester groupings are quantitated using a mass detector (i.e. an evaporative light-scattering detector). The detector response is measured and then normalized to 100%. The individual ester groups are expressed as a relative percentage.

4. Slope of Solid Fat Content (SFC) Profile of Nondigestible Fat

Before determining the SFC values, a sample of the nondigestible fat is heated to a temperature of 140° F. (60° C.) or higher for at least 30 minutes or until the sample is completely melted. The melted sample is then tempered as follows: at 80° F. (26.7° C.) for 15 minutes; at 32° F. (0° C.) for 15 minutes; at 80° F. (26.7° C.) for 30 minutes; at 32° F. (0° C.) for 15 minutes. After tempering, the SFC values of the sample at temperatures of 50° F. (10° C.), 70° F. (21.1° C.), 80° F. (26.7° C.), 92° F. (33.3° C.), and 98.6° F. (37° C.) are determined by pulsed nuclear magnetic resonance (PNMR) after equilibration for 30 minutes at each temperature. The slope of the SFC profile is calculated by subtracting the SFC value at 70° F. (21.1° C.) from the SFC value at 98.6° F. (37° C.) and then dividing by 28.6. The method for determining SFC values by PNMR is described in *J. Amer. Oil Chem. Soc.*, Vol. 55 (1978), pp. 328-31 (herein incorporated by reference, and A.O.C.A. Official Method Cd. 16-81, *Official Methods and Recommended Practices of The American Oil Chemists Society*, 3rd. Ed., 1987, (herein incorporated by reference).

5. Fat Content of Food

The fat content of a food can be determined by heating a sample of the food at 122° F. (50° C.) for at least 20 minutes and then measuring the fat level at the indicated temperature by pulsed nuclear magnetic resonance (PNMR). See references cited above for determining fat content by PNMR.

6. Complete Melting Point of Solid Polyol Polyesters by Differential Scanning Calorimetry (DSC)

The complete melting point of the solid polyol polyesters can be determined by DSC as follows:

Equipment:

Perkin-Elmer 7 Series Thermal Analysis System, Model DSC7, manufactured by Perkin-Elmer, Norwalk, Conn.

Procedure

1. Sample of solid polyol polyesters is heated to at least 10° C. above the complete melt point and mixed thoroughly.
2. 10±2 mg of sample is weighed into sample pan.
3. A scan is performed from about 10° C. above the complete melt point to −60° C. at 5° C. per minute.
4. The temperature of the sample is maintained at −60° C. for 3 minutes and scanned from −60° C. to the original starting temperature at 5° C. per minute (i.e., from about 10° C. above the complete melt point).
5. The complete melt point is the temperature at the intersection of the base line (i.e. specific heat line) with the line tangent to the trailing edge of the endothermic peak.

E. SPECIFIC ILLUSTRATIONS OF POTATO CHIPS FRIED IN FAT COMPOSITIONS OF THE PRESENT INVENTION

The following are specific illustrations of potato chips fried in fat compositions of the present invention:

1. Preparation of Fat Compositions

The following solid sucrose polyesters (Solid SPE's) are used:

|  | Solid SPE I[1] | Solid SPE II[2] | Solid SPE III[3] | Solid SPE IV[4] |
|---|---|---|---|---|
| FAC | | | | |
| $C_{12:0}$ | 21.4% | — | — | — |
| $C_{14:0}$ | 0.2 | — | — | — |
| $C_{16:0}$ | 0.2 | 1.7% | 0.9% | 1.2% |
| $C_{18:0}$ | 1.1 | 1.9 | 1.3 | 4.6 |
| $C_{18:1}$ | 0.1 | 4.0 | 16.7 | 3.7 |
| $C_{18:2}$ | — | 10.5 | 1.6 | 10.9 |
| $C_{18:3}$ | — | 0.7 | 0.2 | — |
| $C_{20:0}$ | 4.7 | 5.0 | 4.6 | 4.6 |
| $C_{22:1}$ | 0.6 | 0.2 | 0.3 | 0.2 |
| $C_{22:0}$ | 70.0 | 73.7 | 72.3 | 71.7 |
| $C_{24:0}$ | 1.8 | 1.9 | 1.9 | 2.8 |
| Other | — | 0.4 | 0.2 | 0.4 |
| Esters | | | | |
| Octa | 92.3% | 79.8% | 82.6% | 71.6% |
| Hepta | 7.2 | 20.2 | 17.1 | 28.2 |
| Hexa | <0.1 | <0.1 | 0.1 | 0.2 |
| Penta | <0.1 | <0.1 | 0.1 | <0.1 |

| | Solid SPE I[1] | Solid SPE II[2] | Solid SPE III[3] | Solid SPE IV[4] |
|---|---|---|---|---|
| Lower | <0.1 | <0.1 | <0.1 | <0.1 |

[1] Obtained by esterifying sucrose first with methyl behenate (93.6% purity), then with methyl laurate (98.5% purity) in a molar ratio of about 5.5:2.5
[2] Obtained by esterifying sucrose with a blend of methyl esters of refined, bleached soybean oil fatty acids and methyl behenate (93.6% purity) in a molar ratio of about 2:6
[3] Obtained by esterifying sucrose first with methyl esters of high oleic sunflower oil fatty acids, then with methyl behenate (88.5% purity) in a molar ratio of about 2:6
[4] Obtained by esterifying sucrose with distilled methyl esters of hardened rapeseed-/cottonseed oil fatty acids, and methyl esters of refined, bleached sunflower oil fatty acids, as described at pages 25–29.

The following liquid sucrose polyesters (liquid SPEs) are used:

| Esters | Liquid SPE I[5] | Liquid SPE II[6] |
|---|---|---|
| Octa | 91.9% | 88.2% |
| Hepta | 8.1 | 11.8 |
| Hexa | <0.1 | <0.1 |
| Penta | <0.1 | <0.1 |
| Lower | <0.1 | <0.1 |

[5] Obtained by esterifying sucrose with methyl esters of soybean oil fatty acids hardened to Iodine Value of about 80
[6] Obtained by esterifying sucrose with methyl esters of soybean oil fatty acids hardened to Iodine Value of about 89.

The Solid SPEs are added to the heated Liquid SPEs, and, optionally refined, bleached, deodorized cottonseed oil (CSO), melted, and then blended together to provide the following fat compositions:

| Fat Composition | Component | % |
|---|---|---|
| A | Solid SPE I | 2.4 |
| | Liquid SPE I | 57.6 |
| | CSO | 40.0 |
| B | Solid SPE II | 2.4 |
| | Liquid SPE I | 57.6 |
| | CSO | 40.0 |
| C | Solid SPE III | 1.8 |
| | Liquid SPE I | 58.2 |
| | CSO | 40.0 |
| D | Solid SPE IV | 3.0 |
| | Liquid SPE II | 97.0 |
| E | Solid SPE IV | 1.6 |
| | Liquid SPE II | 78.4 |
| | CSO | 20.0 | b. Preparation of Potato Chips de

EXAMPLE 1

Norchip potatoes are used which have been sliced to a thickness of about 0.052 inches (0.13 cm). The sliced potatoes are fried in a 5 pound batch fryer at a temperature of 365° F. (185° C.) for 3 minutes, 5 seconds. Approximately 225 chips are fried in each of fat compositions A, B and C. The thixotropic area of each fat composition, as well as the average fat contents of the potato chips fried in each composition, are shown in the following table:

| Fat Composition | Thixotropic Area (Pa/S) | Fat Content (%) |
|---|---|---|
| A | 5450 | 46.2 |
| B | 17139 | 42.9 |
| C | 6072 | 43.0 |

EXAMPLE 2

Norchip potatoes are used which have been sliced to a thickness of 0.052 inches (0.13 cm). The sliced potatoes are fried in a 5 pound batch fryer at a temperature of 365° F. (185° C.) for 2 minutes, 55 seconds. Approximately 250 potato chips are fried in fat composition D.

The thixotropic area of fat composition D, as well as the average fat content of the resulting potato chips, are shown in the following table:

| Thixotropic Area (Pa/S) | Fat Content (%) |
|---|---|
| 34866 | 38.5 |

EXAMPLE 3

Norchip potatoes are used which have been sliced to a thickness of 0.052 inches (0.13 cm). The sliced potatoes are fried in a 5 pound batch fryer at a temperature of 365° F. (185° C.) for 2 minutes, 50 seconds. Approximately 150 potato chips are fried in fat composition E.

The thixotropic area of fat composition E, as well as the average fat content of the resulting potato chips, are shown in the following table:

| Thixotropic Area (Pa/S) | Fat Content (%) |
|---|---|
| 9893 | 35.4 |

What is claimed is:

1. A low moisture food having nonfat ingredients and containing a fat composition having a thixotropic area of about 200,000 pascals/second or less at 92° F. (33.3° C.), and which comprises:
   A. from about 10 to 100% of a nondigestible fat component having a Solid Fat Content (SFC) profile slope between 98.6° F. (37° C.) and 70° F. (21.1° C.) of from 0 to about −0.75 and comprising:
      (1) from about 60 to about 99% of a liquid nondigestible oil having a complete melting point below about 37° C.; and
      (2) from about 1 to about 40% solid polyol fatty acid polyesters having a complete melting point above about 37° C., wherein said polyol has at least 4 hydroxyl groups and wherein the ester groups comprise a combination of:
         (a) $C_{12}$ or higher unsaturated fatty acid radicals, $C_2$–$C_{12}$ saturated fatty acid radicals or mixtures thereof, and
         (b) at least about 15% $C_{20}$ or higher saturated fatty acid radicals,
      wherein the molar ratio of (a) to (b) radicals is from about 1:15 to about 2:1 and wherein at least 4 of said hydroxyl groups are esterified; and
   B. from 0 to about 90% of a digestible triglyceride fat or oil.
2. The food of claim 1 having a moisture content of about 10% or less and wherein said fat composition has a thixotropic area of about 150,000 pascals/second or less at 92° F. (33.3° C.).
3. The food of claim 2 wherein said liquid nondigestible oil is a liquid polyol fatty acid polyester.
4. The food of claim 3 wherein said nondigestible fat component comprises from about 85 to about 99% liquid polyol polyester and from about 1 to about 15% solid polyol polyesters.

5. The food of claim 4 wherein said solid polyol polyesters are sucrose polyesters having from about 7 to 8 hydroxyl groups esterified and wherein the molar ratio of (a) to (b) radicals is from about 1:7 to about 5:3.

6. The food of claim 5 wherein said liquid polyol polyester is a liquid sucrose fatty acid polyester.

7. The food of claim 6 wherein said nondigestible fat component comprises from about 91 to about 99% liquid sucrose polyester and from about 1 to about 9% solid sucrose polyesters.

8. The food of claim 7 wherein said nondigestible fat component comprises from about 94 to about 99% liquid sucrose polyester and from about 1 to about 6% solid sucrose polyesters.

9. The food of claim 7 wherein said ester groups comprise at least about 50% saturated fatty acid radicals (b) having from 20 to 26 carbon atoms, and wherein said nondigestible fat component has an SFC profile slope of from 0 to about −0.3.

10. The food of claim 9 wherein said radicals (a) are unsaturated fatty acid radicals having from 18 to 22 carbon atoms.

11. The food of claim 9 wherein said radicals (a) are saturated fatty acid radicals having from 8 to 12 carbon atoms.

12. The food of claim 9 wherein the molar ratio of (a) to (b) radicals is from about 1:7 to about 3:5.

13. The food of claim 7 wherein said fat composition has a thixotropic area of about 100,000 pascals/second or less at 92° F. (33.3° C.) and comprises from about 35 to 100% nondigestible fat component and from 0 to about 65% digestible triglyceride fat or oil.

14. The food of claim 13 wherein said fat composition has a thixotropic area of about 60,000 pascals/second or less at 92° F. (33.3° C.) and comprises from about 50 to 100% nondigestible fat component and from 0 to about 50% digestible triglyceride fat or oil.

15. The food of claim 14 having a moisture content of about 5% or less.

16. The food of claim 15 which is a potato chip fried in said fat composition to a moisture content of about 3% or less.

17. The potato chip of claim 16 wherein said fat composition has a thixotropic area of about 20,000 Pascals/second or less at 92° F. (33.3° C.).

18. A method for preparing a low moisture fat-coated food, which comprises the step of applying to the surface of the food a fat composition having a thixotropic area of about 1 200,000 pascals/second or less and which comprises:
  A. from about 10 to 100% of a nondigestible fat component having a Solid Fat Content (SFC) profile slope between 98.6° F. (37° C.) and 70° F. (21.1° C.) of from 0 to about −0.75 and comprising:
    (1) from about 60 to about 99% of a liquid nondigestible oil having a complete melting point below about 37° C.; and
    (2) from about 1 to about 40% solid polyol fatty acid polyesters having a complete melting point above about 37° C., wherein said polyol has at least 4 hydroxyl groups and wherein the ester groups comprise a combination of:
      (a) $C_{12}$ or higher unsaturated fatty acid radicals, $C_2$-$C_{12}$ saturated fatty acid radicals or mixtures thereof, and
      (b) at least about 15% $C_{20}$ or higher saturated fatty acid radicals,
    wherein the molar ratio of (a) to (b) radicals is from about 1:15 to about 2:1 and wherein at least 4 of the hydroxyl groups are esterified; and
  B. from 0 to about 90% of a digestible triglyceride fat or oil.

19. The method of claim 18 wherein the fat-coated food has a moisture content of about 10% or less and wherein the fat composition has a thixotropic area of about 150,000 pascals/second or less at 92° F. (33.3° C.).

20. The method of claim 19 wherein the liquid nondigestible oil is a liquid polyol fatty acid polyester.

21. The method of claim 20 wherein said nondigestible fat component comprises from about 85 to about 99% liquid polyol polyester and from about 1 to about 15% solid polyol polyesters.

22. The method of claim 21 wherein the solid polyol polyesters are sucrose polyesters having from about 7 to 8 hydroxyl groups esterified and wherein the molar ratio of (a) to (b) radicals is from about 1:7 to about 5:3.

23. The method of claim 22 wherein the liquid polyol polyester is a liquid sucrose fatty acid polyester.

24. The method of claim 23 wherein the nondigestible fat component comprises from about 91 to about 99% liquid sucrose polyester and from about 1 to about 9% solid sucrose polyesters.

25. The method of claim 24 wherein the nondigestible fat component comprises from about 94 to about 99% liquid sucrose polyester and from about 1 to about 6% solid sucrose polyesters.

26. The method of claim 24 wherein the ester groups comprise at least about 50% saturated fatty acid radicals (b) having from 20 to 26 carbon atoms, and wherein the nondigestible fat component has an SFC profile slope of from 0 to about −0.3.

27. The method of claim 26 wherein radicals (a) are unsaturated fatty acid radicals having from 18 to 22 carbon atoms.

28. The method of claim 26 wherein radicals (a) are saturated fatty acid radicals having from 8 to 12 carbon atoms.

29. The method of claim 26 wherein the molar ratio of (a) to (b) radicals is from about 1:7 to about 3:5.

30. The method of claim 29 wherein the fat composition has a thixotropic area of about 100,000 pascals/second or less at 92° F. (33.3° C.) and comprises from about 35 to 100% nondigestible fat component and from 0 to about 65% digestible triglyceride fat or oil.

31. The method of claim 30 wherein the fat composition has a thixotropic area of about 60,000 pascals/second or less at 92° F. (33.3° C.) and comprises from about 50 to 100% nondigestible fat component and from 0 to about 50% digestible triglyceride fat or oil.

32. The method of claim 31 wherein the fat-coated food has a moisture content of about 5% or less.

33. The method of claim 32 for preparing potato chips which comprises the step of immersing sliced potatoes or fabricated potato pieces in a fat composition heated to a temperature of from about 300° to about 400° F. (from about 148.9° to about 204.4° C.) for a period of time sufficient to achieve a moisture content of about 3% or less in the potato chips.

34. The method of claim 33 wherein the fat composition has a thixotropic area of about 20,000 pascals/second or less 92° F. (33.3° C.).

35. A fat composition having a thixotropic area of about 200,000 pascals/second or less at 92° F. (33.3° C.), which comprises:
  I. from about 10 to 100% of a nondigestible fat component having a Solid Fat Content (SFC) profile slope between 98.6° F. (37° C.) and 70° F. (21.1° C.) of from 0 to about −0.75 and comprising:
    (A) from about 60 to about 99% of a liquid nondigestible oil having a complete melting point below about 37° C.; and
    (B) (1) from about 1 to about 40% solid polyol fatty acid polyesters having a complete melting point above about 37° C., wherein said polyol has at least 4 hydroxyl groups and wherein the ester groups comprise a combination of:
      (a) $C_{12}$ or higher unsaturated fatty acid radicals, or a mixture of said unsaturated radicals with $C_2$–$C_{12}$ saturated fatty acid radicals, and
      (b) at least about 15% $C_{20}$ or higher saturated fatty acid radicals, wherein the molar ratio of (a) to (b) radicals is from about 1:15 to about 2:1 and wherein at least 4 of said hydroxyl groups are esterified; or
    (2) from about 1 to about 9% solid polyol fatty acid polyesters having a complete melting point above about 37° C., wherein said polyol has at least 4 hydroxyl groups and wherein the ester groups comprise a combination of:
      (c) $C_2$–$C_{12}$ saturated fatty acid radicals, and
      (d) at least about 30% $C_{20}$ or higher saturated fatty acid radicals,
    wherein the molar ratio of (c) to (d) radicals is from about 1:15 to about 2:1 and wherein at least 4 of said hydroxyl groups are esterified; and
  II. from 0 to about 90% of a digestible triglyceride fat or oil.

36. The composition of claim 35 which has a thixotropic area of about 150,000 pascals/second or less at 92° F. (33.3° C.) and wherein said liquid nondigestible oil is a liquid polyol fatty acid polyester.

37. The composition of claim 36 wherein said liquid polyol polyester is a liquid sucrose fatty acid polyester.

38. The composition of claim 37 wherein each of said solid polyol polyesters (1) and (2) are sucrose polyesters having from about 7 to 8 hydroxyl groups esterified and wherein the molar ratios of (a) to (b) radicals and (c) to (d) radicals are from about 1:7 to about 5:3.

39. The composition of claim 38 wherein said ester groups of each of said solid sucrose polyesters (1) and (2) comprise at least about 50% saturated fatty acid radicals (a) and (b) having from 20 to 26 carbon atoms, and wherein said nondigestible fat component has an SFC profile slope of from 0 to about −0.3.

40. The composition of claim 39 wherein said radicals (b) and (d) are saturated fatty acid radicals having 22 carbon atoms.

41. The composition of claim 39 wherein the molar ratios of (a) to (b) radicals and (c) to (d) radicals are from about 1:7 to about 3:5.

42. The composition of claim 41 wherein said nondigestible fat component comprises from about 91 to about 99% liquid sucrose polyester and from about 1 to about 9% solid sucrose polyesters (1).

43. The composition of claim 42 wherein said nondigestible fat component comprises from about 94 to about 99% liquid sucrose polyester and from about 1 to about 6% solid sucrose polyesters (1).

44. The composition of claim 43 wherein said radicals (a) are unsaturated fatty acid radicals having from 18 to 22 carbon atoms.

45. The composition of claim 44 wherein said radicals (a) are unsaturated fatty acid radicals having 18 carbon atoms.

46. The composition of claim 41 wherein said nondigestible fat component comprises from about 94 to about 99% liquid sucrose polyesters and from about 1 to about 6% sucrose polyesters (2).

47. The composition of claim 46 wherein said radicals (c) are saturated fatty acid radicals having from 8 to 12 carbon atoms.

48. The composition of claim 41 which has a thixotropic area of about 100,000 pascals/second or less at 92° F. (33.3° C.) and which comprises from about 35 to 100% nondigestible fat component and from 0 to about 65% digestible triglyceride fat or oil.

49. The composition of claim 48 which has a thixotropic area of about 60,000 pascals/second or less at 92° F. (33.3° C.) and which comprises from about 50 to 100% nondigestible fat component and from 0 to about 50% digestible triglyceride fat or oil.

50. The composition of claim 49 which has a thixotropic area of about 20,000 pascals/second or less at 92° F. (33.3° C.).

* * * * *